United States Patent [19]
Ge et al.

[11] Patent Number: 5,632,547
[45] Date of Patent: May 27, 1997

[54] DEVICE FOR CORRECTING BRIGHTNESS ROLL-OFF AT AN END OF A LAMP

[75] Inventors: Lei Ge, Shanghai, China; Murray R. Zink, Waterloo, Canada

[73] Assignee: NCR Corporation, Dayton, Ohio

[21] Appl. No.: 530,046

[22] Filed: Sep. 19, 1995

[51] Int. Cl.⁶ .................................................. G03B 15/02
[52] U.S. Cl. ........................ 362/16; 362/217; 362/218; 362/255; 362/345; 362/396
[58] Field of Search ................................. 362/161, 181, 362/255, 256, 294, 345, 306, 218, 217, 396, 260; 313/318.11; 355/67

[56] References Cited

U.S. PATENT DOCUMENTS

| | | | |
|---|---|---|---|
| 3,377,482 | 4/1968 | Podany | 362/255 |
| 5,469,303 | 11/1995 | Wun et al. | 362/260 X |

Primary Examiner—Stephen F. Husar
Attorney, Agent, or Firm—Michael Chan

[57] ABSTRACT

An apparatus comprises an imaging camera including a frame part and a tubular lamp for providing light for the camera. The apparatus further comprises a device connected between the frame part of the camera and an end of the lamp for (i) grounding out electrostatic charge on an outer surface of the lamp, (ii) dissipating heat generated by the lamp and (iii) gradually correcting brightness roll-off at the end of the lamp to produce a uniform illumination of an imaging field of the camera. The device includes (i) a reflector portion for reflecting light from the lamp and (ii) a locating portion for locating the reflector portion relative to the lamp such that light reflected from the reflector portion cooperates with light from the lamp to gradually correct brightness roll-off at the end of the lamp to produce the uniform illumination of the imaging field of the camera.

28 Claims, 5 Drawing Sheets

DEVICE FOR CORRECTING BRIGHTNESS ROLL-OFF AT AN END OF A LAMP

BACKGROUND OF THE INVENTION

The present invention relates to a device for correcting brightness roll-off at an end of a lamp, and is particularly directed to such a device which gradually corrects brightness roll-off at an end of a tubular lamp to produce a uniform illumination of an imaging field of a contact image sensor (CIS) type image camera.

A tubular fluorescent lamp is typically used to illuminate the imaging field of a CIS type image camera. A characteristic associated with a tubular fluorescent lamp is that the brightness output level at each end of the lamp rolls off gradually. This gradual roll-off in brightness output level at each end of the lamp results in a non-uniform illumination of the imaging field of the camera.

A known approach in attempts to produce a uniform illumination of the imaging field is to use a longer lamp so that only the middle flat portion of the lamp is used for illumination. A disadvantage of using this approach is that a larger lamp must be used. This results in greater power consumption and more heat dissipation. Another known approach in attempts to produce a uniform illumination of the imaging field is to place a reflective plate along the longitudinal extent of the lamp. The use of a reflective plate creates a relatively bulky package. Accordingly, this approach is undesirable when a more compact package is desired.

SUMMARY OF THE INVENTION

In accordance with the present invention, a device for use with a lamp comprises a reflector portion for reflecting light from the lamp. The device further comprises means for interconnecting an end of the lamp and a frame part to (i) ground out static charge on an outer surface of the lamp, (ii) dissipate heat generated by the lamp and (iii) locate the reflector portion relative to the end of the lamp such that light reflected from the reflector portion cooperates with light from the lamp to gradually correct brightness roll-off at the end of the lamp to produce a uniform brightness output at the end of the lamp.

Preferably, the interconnecting means includes (i) a clip portion extending from the reflector portion and for connecting to the end of the lamp to enable the reflector portion to reflect light from the lamp and (ii) a hook portion extending from the clip portion and for connecting to a frame part of a camera to locate the reflector portion relative to the lamp such that light reflected from the reflector portion cooperates with light from the lamp to produce a uniform illumination of an imaging field of the camera. The clip portion has a semicircular shape and an arcuate inner surface which conforms to the curvature of the outer surface of the lamp. The hook portion has a generally U-shape which can extend around a portion of the frame part to connect to the frame part of the camera. At least one tab interconnects the clip portion and the hook portion.

In one embodiment, the reflector portion includes a parabolic body portion and a pointed end portion projecting away from the parabolic body portion. The pointed end portion points in a direction towards the center of the lamp. In another embodiment, the reflector portion has a conical shape which widens towards the center of the lamp. In both embodiments, the reflector portion, the clip portion, and the hook portion cooperate to provide a grounding path for electrostatic charge on the outer surface of the lamp when the clip portion is connected to the end of the lamp and the hook portion is connected to the frame part of the camera. Also, the reflector portion, the clip portion, and the hook portion cooperate to dissipate heat generated by the lamp when the clip portion is connected to the lamp and the hook portion is connected to the frame part of the camera.

DETAILS OF THE INVENTION

Figure 1:
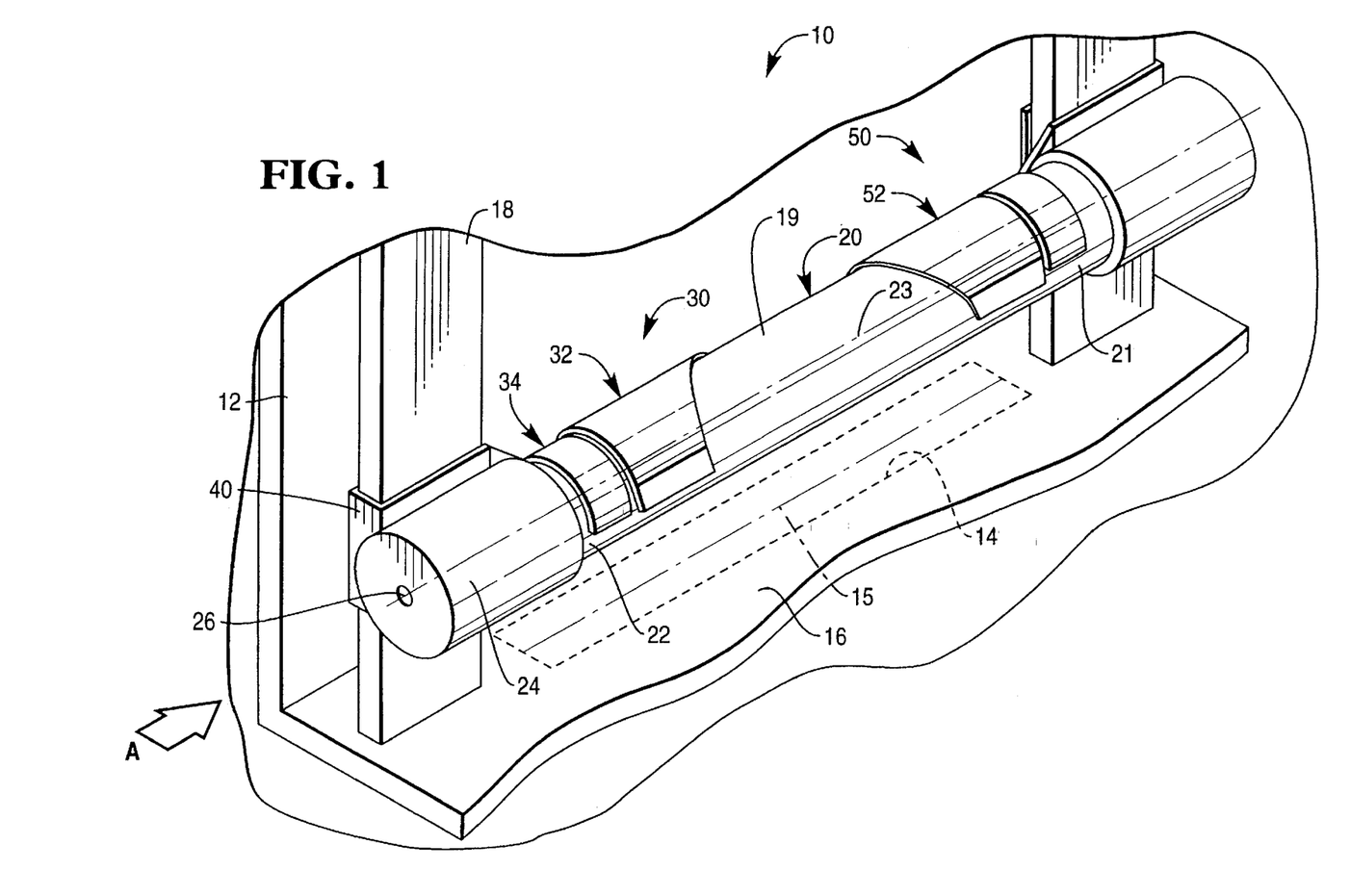
FIG. 1 is a perspective view of a contact image sensor (CIS) type image camera embodying a device constructed in accordance with the present invention.

Referring to FIG. 1, a device 30 constructed in accordance with the present invention is embodied in a contact image sensor (CIS) type image camera 10. The camera 10 includes a camera body 12 and a frame part 18 located in the interior of the body 12. The frame part 18 is fixedly connected to the body 12. The camera 10 further includes a longitudinally extending imaging field 14 located at a bottom interior portion 16 of the body 12. An imaginary scan line 15 is centered along the longitudinal extent of the imaging field 14.

A tubular fluorescent lamp 20 is disposed within the body 12 of the camera 10 to provide lighting for an image of an object (not shown) which is to be focused onto the imaging field 14. The image is focused onto the imaging field 14 in a conventional manner using a known lens arrangement (also not shown), and therefore will not be described. The lamp 20 has a longitudinal central axis 23 which extends parallel to the scan line 15 centered along the longitudinal extent of the imaging field 14. The longitudinal central axis 23 lies above the scan line 15 as shown in FIG. 1. The lamp 20 has opposite longitudinal ends 21, 22 and a curved outer surface 19 interposing the ends 21, 22. Since the ends 21, 22 are identical, only the end 22 of the lamp 20 is described in detail.

A rubber insulation piece 24 is disposed at the end 22 of the lamp 20. The insulation piece 24 surrounds and covers electrical conductors 26 which are electrically connectable with the filament (not shown) of the lamp 20. The conductors 26 are connected to a power source (also not shown)

which provides electrical power to the filament of the lamp 20. It should be noted that electrical connectors which interconnect the power source and the conductors 26 are not shown for the purpose of better illustrating the features of the present invention.

Figure 2:
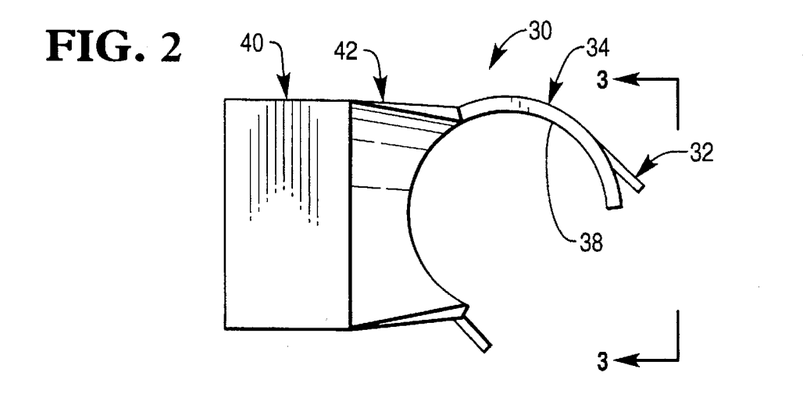
FIG. 2 is a view looking in the direction of arrow A in FIG. 1 and showing only the device constructed in accordance with the present invention.
Figure 3:
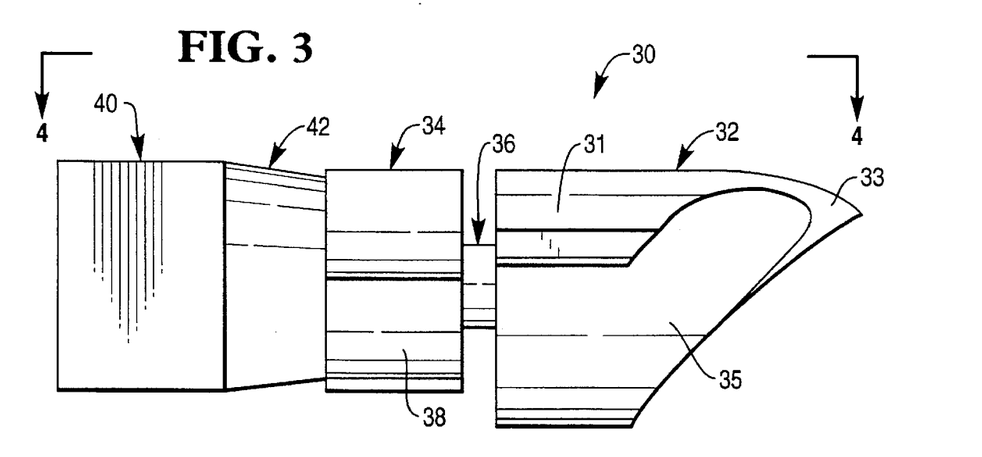
FIG. 3 is a view taken approximately along line 3—3 in FIG. 2.
Figure 4:
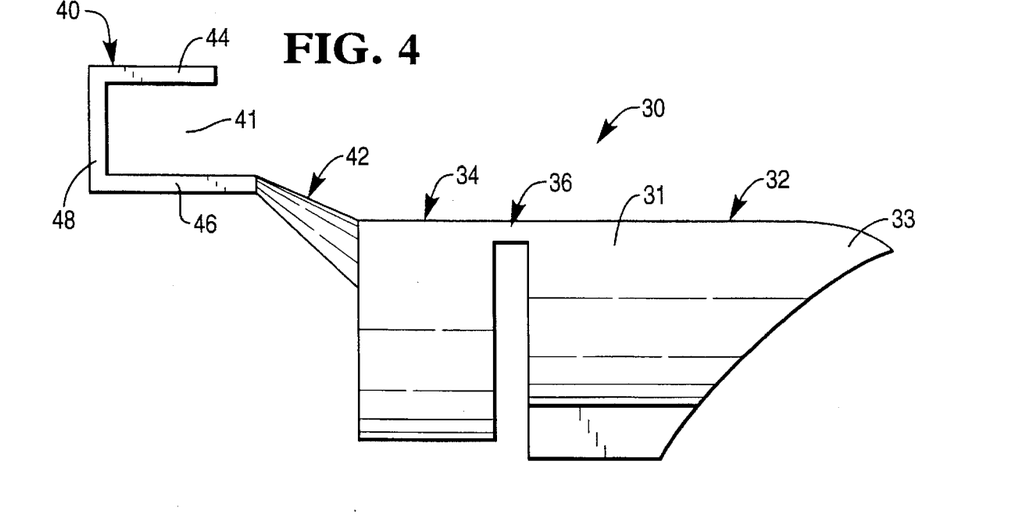
FIG. 4 is a view taken approximately along line 4—4 in FIG. 3.

A device 30 constructed in accordance with the present invention is secured to the frame part 18 of the camera 10, as shown in FIG. 1. Referring to FIGS. 2–4, the device 30 includes a reflector portion 32 which reflects light from the lamp 20. The reflector portion 32 includes a parabolic body portion 31 and a pointed portion 33 which projects away from the parabolic body portion 31. The reflector portion 32 has the shape of a pen-nib, as best shown in FIGS. 3 and 4, which gradually tapers away from the end 22 of the lamp 20 towards the center of the lamp 20. The reflector portion 32 has an arcuate inner reflective surface 35 (FIG. 3) which reflects light from the lamp 20. The reflective surface 35 is oriented relative to the scan line 15 such that light from the reflective surface 35 is directed towards the scan line 15 and thus towards the imaging field 14.

The device 30 further includes a clip portion 34 which is connected through a tab 36 to the reflector portion 32. Preferably, the clip portion 34 has a semicircular shape. The clip portion 34 has an inner arcuate surface 38 having a curvature which is slightly smaller than the curvature of the outer surface 19 (FIG. 1) of the lamp 20. The slightly smaller curvature of the arcuate surface 38 enables the clip portion 34 to be snapped onto the outer surface 19 at the end 22 of the lamp 20 and secured thereto.

The device 30 further includes a hook portion 40 which is connected through an interconnecting portion 42 to the clip portion 34. The hook portion 40 includes a pair of flat plate portions 44, 46 which are interconnected by a flat plate portion 48. The plate portions 44, 46 are parallel to each other. The three plate portions 44, 46, 48 form a U-shaped structure with an opening 41 (FIG. 4) which enables the device 30 to be connected to the frame part 18 of the camera 10. The interconnecting portion 42 provides a smooth transition between the flat plate portion 44 and the arcuate clip portion 34.

The material of the device 30 is, preferably, a polished high reflective material such as stainless steel. A white layer at the reflector portion 32 is preferred for diffused reflection. Alternatively, the material of the device 30 may be copper. Both stainless steel and beryllium copper provide spring characteristics required of the clip portion 34. It is contemplated that the device 30 could also be molded from plastic with a high strain limit to meet the spring characteristics of the clip portion 34 and then plated to provide a high reflective surface on the reflector portion 32. Also, the material of the device 30 has relatively high electrical conductivity characteristics and relatively high heat conductivity characteristics.

Preferably, the device 30 is manufactured by first taking a properly sized flat piece of material and notching out slots at the appropriate locations to form the tab 36. Some material at the appropriate locations is then cut away to form the pointed portion 33. The specific converging profile of the pointed portion 33 depends upon the diameter of the particular make of the lamp 20 with which the device 30 is intended to be used. Thereafter, the material at the appropriate locations is rolled to form the reflector portion 32 and the clip portion 34. The specific parabolic shape of the reflector portion 32 and the specific curvature of the clip portion 34 depend upon the particular make of the lamp 20 with which the device 30 is intended to be used.

While the reflector portion 32 and the clip portion 34 are being rolled to form their specific shapes, the material which will form the hook portion 40 is maintained flat. Accordingly, the interconnecting portion 42 is formed while the clip portion 34 is being rolled to form its shape. After the reflector portion 32, the clip portion 34, and the interconnecting portion 42 are formed, the hook portion 40 is formed into its U-shaped structure by bending the material at the appropriate locations. Known conventional machine tools are used to manufacture the device 30 in the manner as just described.

The device 30 is installed into the camera 10 (as shown in FIG. 1) by first positioning the opening 41 of the U-shaped structure of the hook portion 40 towards the frame part 18 of the camera 10, and then sliding the hook portion 40 onto the frame part 18. When the hook portion 40 is slid onto the frame part 18, the plate portions 44, 46 grip the frame part 18 to connect the device 30 to the frame part 18. The clip portion 34 is then snapped onto the outer surface 19 of the lamp 20 to connect the device 30 to the end 22 of the lamp 20.

It should be apparent that the clip portion 34 and the hook portion 40 cooperate to position and align the lamp 20 relative to the scan line 15. The clip portion 34 is connected to the lamp 20 and the hook portion 40 locates this assembly relative to the scan line 15.

Another device 50 including a reflector portion 52 also constructed in accordance with the present invention is connected to the other end 21 of the lamp 20. The device 50 is constructed as a mirror image of the device 30 shown in FIG. 1–4. This is because of the asymmetry of the frame part 18 of the camera 10 relative to the scan line 15.

Figure 5:
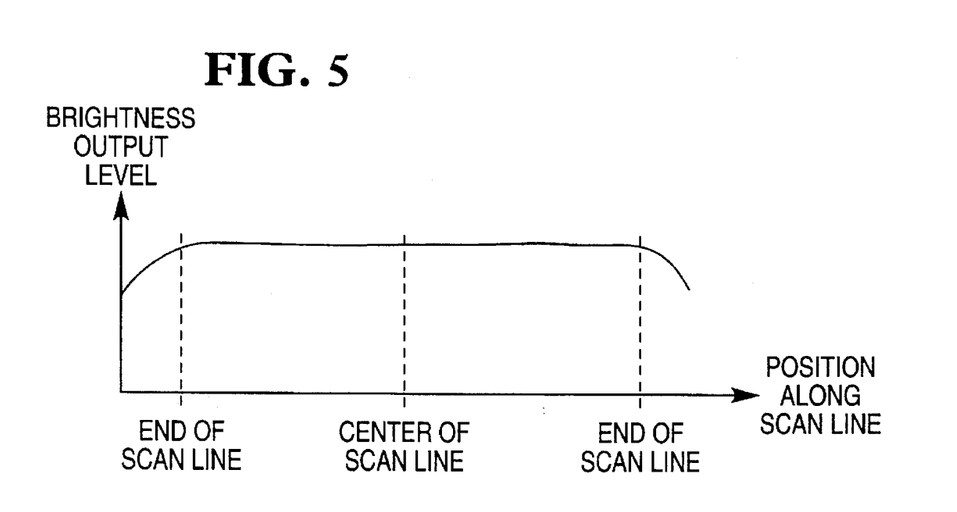
FIG. 5 is a graphical representation of the brightness output level along the longitudinal extent of a tubular lamp not using the device of FIGS. 2–4.

When the devices 30, 50 constructed in accordance with the present invention are not installed to reflect light from the opposite ends 21, 22 of the lamp 20, the brightness output level along the scan line 15 in the imaging field 14 is graphically depicted in FIG. 5. The brightness output level is uniform in the central portion of the scan line 15. The brightness output level at each end portion of the scan line 15 rolls off gradually as shown in FIG. 5. The brightness output level at each end portion of the scan line 15 rolls off gradually as shown because of the brightness output level of the lamp 20 gradually rolling off at the opposite ends 21, 22 of the lamp 20.

Figure 6:
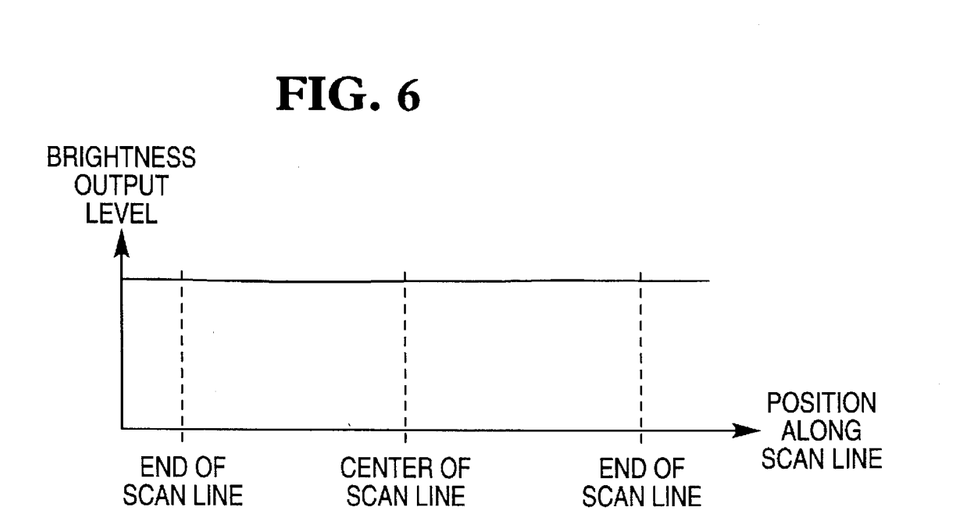
FIG. 6 is a graphical representation similar to FIG. 5 and represents the brightness output level along the longitudinal extent of the tubular lamp using the device of FIGS. 2–4.

When the devices 30, 50 constructed in accordance with the present invention are installed (as shown in FIG. 1) to reflect light from the lamp 20, the brightness output level along the scan line 15 in the imaging field 14 is graphically depicted in FIG. 6. The brightness output level is uniform along the entire extent of the scan line 15 including the central portion and the opposite end portions of the scan line 15. The brightness output level is uniform along the entire extent of the scan line 15, as shown in FIG. 6, because of the pen-nib shape of the reflector portion 32 of the device 30 and the pen-nib shape of the reflector portion 52 of the device 50. The operation of the device 50 is identical to the operation of the device 30. For simplicity, only the operation of the device 30 is described in detail.

More specifically, the pen-nib shape of the reflector portion 32 results in a gradually increasing amount of reflected light from the lamp 20 at the end 22 of the lamp 20. The amount of reflected light at the end 22 of the lamp 20 gradually increases in the direction towards the end 22 of the lamp 20. This occurs because the area of the reflective surface 35 increases from the pointed portion 33 towards the parabolic body portion 31. The result is the greatest brightness increase near the end 22 of the lamp 20 where the brightness roll-off is the greatest. This gradual increase of reflected light at the end 22 of the lamp 20 cooperates with light from the lamp 20 to provide a uniform brightness output level at the respective end portion of the scan line 15, as shown in FIG. 6.

It should be apparent that the gradualness of reflected light at the end 22 of the lamp 20 depends upon the specific taper of the pen-nib shape of the reflector portion 32 of the device 30. Accordingly, the specific taper of the pen-nib shape of the reflector portion 32 can be tailored to accommodate a particular make of the lamp 20. The direction of the reflected light at the end 22 of the lamp 20 depends upon the location of the clip portion 34 and the location of the hook portion 40 relative to each other. Accordingly, the specific locations of the clip portion 34 and the hook portion 40 relative to each other can be tailored during the manufacturing process to accommodate a particular position of the lamp 20 relative to the scan line 15.

A number of advantages result by connecting the device 30 to the end 22 of the lamp 20 as shown in FIG. 1. One advantage is that the brightness roll-off at the end 22 of the lamp 20 is corrected to provide the uniform brightness output level at the respective end portion of the scan line 15 as shown in FIG. 6. Another advantage is that the device 30, when connected to the frame part 18 of the camera 10 and to the end 22 of the lamp 20, acts as a grounding path for electrostatic charge on the outer surface 19 of the lamp 20. This minimizes the chance of electrostatic build up which could cause damage to the lamp 20. Still another advantage is that the device 30, when connected to the frame part 18 of the camera 10 and to the end 22 of the lamp 20, acts as a heat sink to dissipate heat generated by the lamp 20. This lower heat build up in the lamp 20 and thus increases the life of the lamp 20.

Further, the use of the device 30 takes up a relatively small amount of space. A relatively compact packaging of the camera 10 is thereby achieved. Also, the device 30 is cost effective to manufacture and easy to store in inventory since there is a minimum number of parts.

A second embodiment of the present invention is illustrated in FIGS. 7-10. Since the embodiment of the invention illustrated in FIGS. 7-10 is generally similar to the embodiment illustrated in FIGS. 1-6, similar numerals are utilized to designate similar components, the suffix letter "a" being associated with the embodiment of FIGS. 7-10 to avoid confusion.

In the embodiment of FIGS. 7-10, the reflector portion 32a of the device 30a has a conical shape. Specifically, the inner arcuate reflective surface 35a (FIG. 9) of the reflective portion 32a of the device 30a has a conical shape. The particular conical shape of the reflector portion 32 can be designed to accommodate the particular make of lamp to which the device 30a will be connected.

Figure 7:
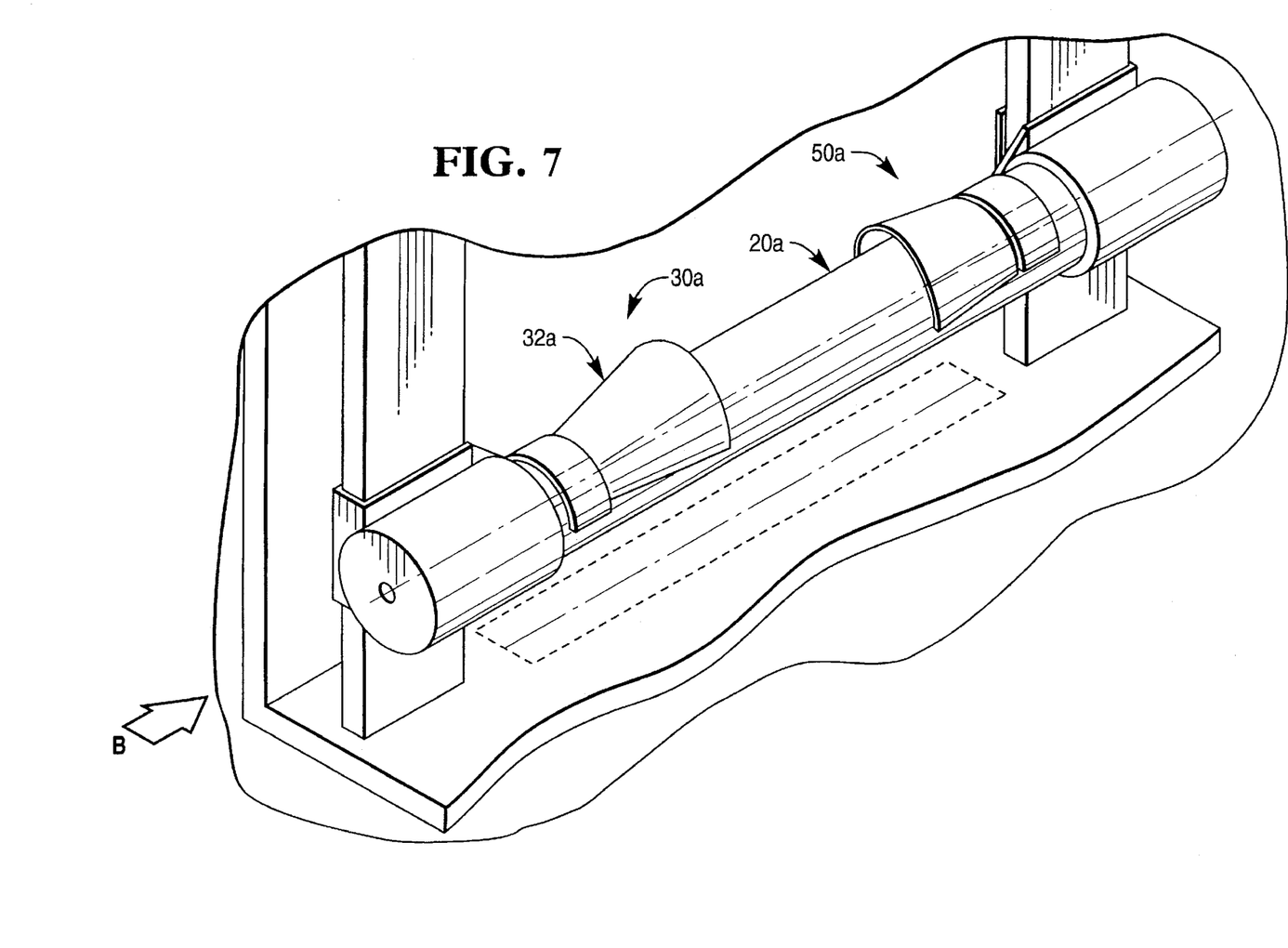
FIG. 7 is a view similar to FIG. 1 and showing another embodiment of the present invention.
Figure 8:
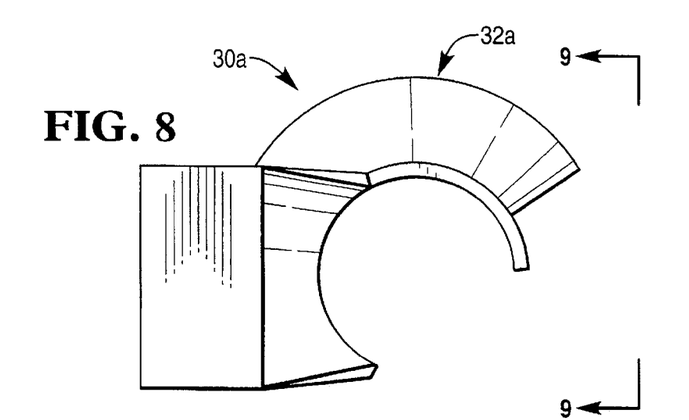
FIG. 8 is a view looking in the direction of arrow B in FIG. 7 and showing only the device constructed in accordance with the present invention.
Figure 9:
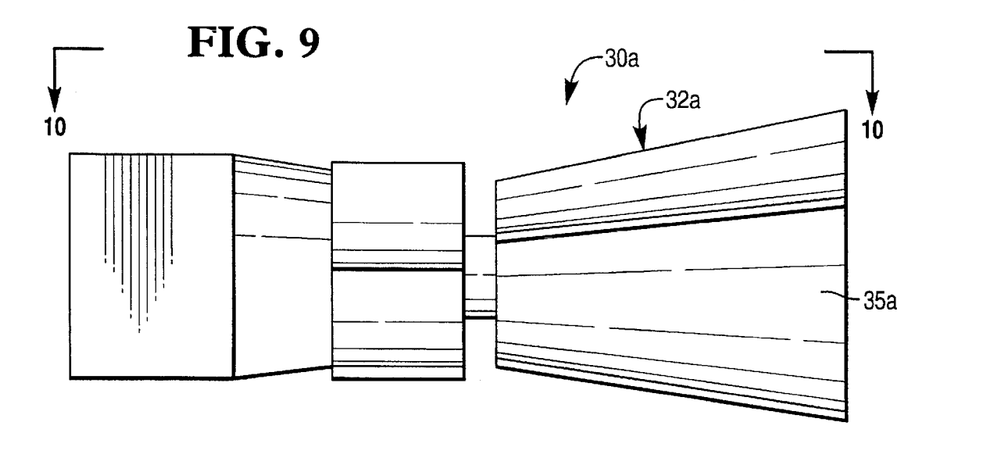
FIG. 9 is a view taken approximately along line 9—9 in FIG. 8.
Figure 10:
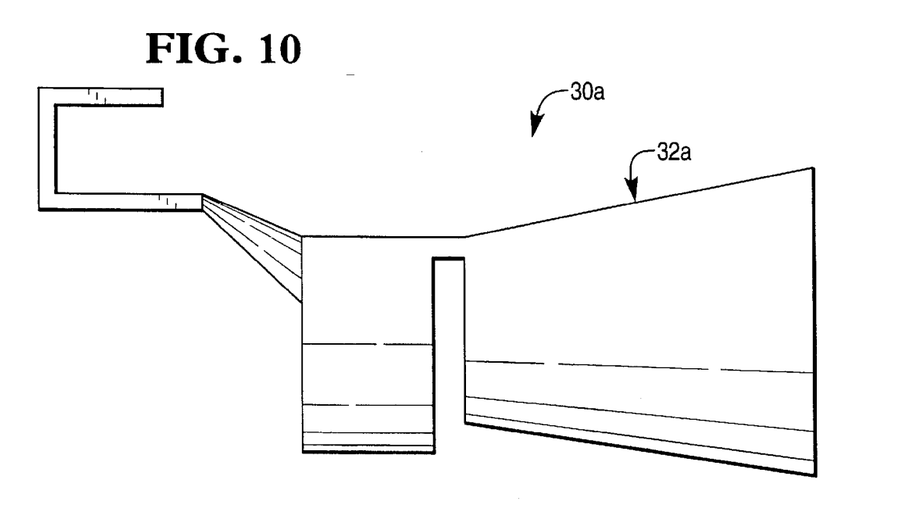
FIG. 10 is a view taken approximately along line 10—10 in FIG. 9.

When the device 30a is connected to the lamp 20a, as shown in FIG. 7, the conical shape widens towards the center of the lamp 20. The amount of light reflected from the reflective surface 35a gradually increases towards the end 22a of the lamp 20a. Since the amount of light reflected from the reflective surface 35a gradually increases towards the end 22a of the lamp 20a and the brightness output of the lamp 20a gradually rolls off towards the end 22a of the lamp 20a, the result is a uniform brightness output level at the respective end portion of the scan line 15a in the same manner as already described hereinabove with regard to the embodiment of FIGS. 1-6.

The device 30a is manufactured using the same techniques described hereinabove with regard to the device 30 in the embodiment shown in FIGS. 1-6. The device 50a is constructed as a mirror image of the device 30a. The operation of the devices 30a, 50a are identical.

From the above description of the invention, those skilled in the art to which the present invention relates will perceive improvements, changes and modifications. Such improvements, changes and modifications within the skill of the art to which the present invention relates are intended to be covered by the appended claims.

We claim:

1. A device connectable between a frame part of a camera and an end of a lamp which provides light for an imaging field of the camera, said device comprising:

a reflector portion for reflecting light from the lamp;

a clip portion extending from said reflector portion and for connecting to the end of the lamp to enable said reflector portion to reflect light from the lamp; and a hook portion extending from said clip portion and for connecting to the frame part to locate said reflector portion relative to the lamp such that light reflected from said reflector portion cooperates with light from the lamp to gradually correct brightness roll-off at the end of the lamp to produce a uniform illumination of the imaging field of the camera.

2. A device according to claim 1, wherein said clip portion has a semicircular shape and an arcuate inner surface which conforms to the curvature of an outer surface of the lamp.

3. A device according to claim 1, wherein said hook portion has a generally U-shape which can extend around at least a portion of the frame part of camera to connect to the frame part to locate said reflector portion relative to the lamp.

4. A device according to claim 1, further comprising at least one tab which interconnects said clip portion and said hook portion.

5. A device according to claim 1, wherein said reflector portion includes a parabolic portion and a pointed end portion projecting away from said parabolic body portion.

6. A device according to claim 5, wherein said pointed end portion points in a direction towards the center of the lamp.

7. A device according to claim 1, wherein said reflector portion has a conical shape which widens towards the center of the lamp.

8. A device according to claim 2, wherein said reflector portion, said clip portion, and said hook portion cooperate to provide a grounding path for electrostatic charge on the outer surface of the lamp when said device is connected between the frame part of the camera and the end of the lamp.

9. A device according to claim 1, wherein said reflector portion, said clip portion, and said hook portion cooperate to dissipate heat generated by the lamp when said device is connected between the frame part of the camera and the end of lamp.

10. A device for use with a lamp, said device comprising:

a reflector portion for reflecting light from the lamp; and a connection portion extending from said reflector portion and for (i) connecting to an end of the lamp to enable said reflector portion to reflect light from the lamp, and (ii) connecting to a frame part to locate said reflector portion relative to the lamp such that electrostatic charge on an outer surface of the lamp is grounded out, heat generated by the lamp is dissipated, and light reflected from said reflector portion cooperates with light from the lamp to gradually correct brightness roll-off at the end of the lamp to produce a uniform brightness output at the end of the lamp.

11. An apparatus comprising:

an imaging camera including a frame part;

a tubular lamp for providing light for said camera; and a device including (i) a first portion connected to an end of said lamp to reflect light from said lamp, and (ii) a second portion connected to said frame part of said camera to ground out electrostatic charge on an outer surface of said lamp, dissipate heat generated by said lamp, and gradually correct brightness roll-off at the end of said lamp to produce a uniform illumination of an imaging field of said camera.

12. An apparatus according to claim 11, wherein said first portion includes a reflector for reflecting light from said lamp, and said second portion includes a connection portion for locating said reflector portion relative to said lamp such that light reflected from said reflector portion cooperates with light from said lamp to gradually correct brightness roll-off at the end of said lamp to produce the uniform illumination of the imaging field of said camera.

13. An apparatus according to claim 11, wherein said lamp is a fluorescent tubular lamp.

14. A device for use with a lamp, said device comprising:

a reflector portion for reflecting light from the lamp; and a connection portion extending from said reflector portion and for (i) connecting to an end of the lamp to enable said reflector portion to reflect light from the lamp, and (ii) connecting to a frame part to locate said reflector portion relative to the lamp such that electrostatic charge on an outer surface of the lamp is grounded out, heat generated by the lamp is dissipated, and light reflected from said reflector portion cooperates with light from the lamp to gradually correct brightness roll-off at the end of the lamp to produce a uniform brightness output at the end of the lamp;

said connection portion including (i) a clip portion extending from said reflector portion and for connecting to the end of the lamp to enable said reflector portion to reflect light from the lamp, and (ii) a hook portion extending from said clip portion and for connecting to the frame part to locate said reflector portion relative to the lamp such that light reflected from said reflector portion cooperates with light from the lamp to produce the uniform brightness output at the end of the lamp.

15. A device according to claim 14, wherein said clip portion has a semicircular shape and an arcuate inner surface which conforms to the curvature of the outer surface of the lamp.

16. A device according to claim 14, wherein said hook portion has a generally U-shape which can extend around at least a portion of the frame part to connect to the frame part to locate said reflector portion relative to the lamp.

17. A device according to claim 14, further comprising at least one tab which interconnects said clip portion and said hook portion.

18. A device for use with a lamp, said device comprising:

a reflector portion for reflecting light from the lamp, said reflector portion including a parabolic body portion and a pointed end portion projecting away from said parabolic body portion; and a connection portion extending from said reflector portion and for (i) connecting to an end of the lamp to enable said reflector portion to reflect light from the lamp, and (ii) connecting to a frame part to locate said reflector portion relative to the lamp such that electrostatic charge on an outer surface of the lamp is grounded out, heat generated by the lamp is dissipated, and light reflected from said reflector portion cooperates with light from the lamp to gradually correct brightness roll-off at the end of the lamp to produce a uniform brightness output at the end of the lamp.

19. A device according to claim 18, wherein said pointed end portion points in a direction towards the center of the lamp.

20. A device for use with a lamp, said device comprising:

a reflector portion for reflecting light from the lamp, said reflector portion having a conical shape which widens towards the center of the lamp; and a connection portion extending from said reflector portion and for (i) connecting to an end of the lamp to enable said reflector portion to reflect light from the lamp, and (ii) connecting to a frame part to locate said reflector portion relative to the lamp such that electrostatic charge on an outer surface of the lamp is grounded out, heat generated by the lamp is dissipated, and light reflected from said reflector portion cooperates with light from the lamp to gradually correct brightness roll-off at the end of the lamp to produce a uniform brightness output at the end of the lamp.

21. An apparatus comprising:

an imaging camera including a frame part, said camera being a contact image sensor type image camera;

a tubular lamp for providing light for said camera; and a device including (i) a first portion connected to an end of said lamp to reflect light from said lamp, and (ii) a second portion connected to said frame part of said camera to ground out electrostatic charge on an outer surface of said lamp, dissipate heat generated by said lamp, and gradually correct brightness roll-off at the end of said lamp to produce a uniform illumination of an imaging field of said camera.

22. An apparatus comprising:

an imaging camera including a frame part;

a tubular lamp for providing light for said camera; and a device including (i) a first portion connected to an end of said lamp to reflect light from said lamp, and (ii) a second portion connected to said frame part of said camera to ground out electrostatic charge on an outer surface of said lamp, dissipate heat generated by said lamp, and gradually correct brightness roll-off at the end of said lamp to produce a uniform illumination of an imaging field of said camera;

said first portion including a reflector portion for reflecting light from said lamp;

said second portion including a locating portion for locating said reflector portion relative to said lamp such that light reflected from said reflector portion cooperates with light from said lamp to gradually correct brightness roll-off at the end of said lamp to produce the uniform illumination of the imaging field of said camera;

said locating portion including (i) a clip portion extending from said reflector portion and for connecting to the end of said lamp to enable said reflector portion to reflect light from said lamp, and (ii) a hook portion extending from said clip portion and for connecting to a frame part of said camera to locate said reflector portion relative to said lamp such that light reflected from said reflector portion cooperates with light from said lamp to gradually correct brightness roll-off at the end of said lamp to produce the uniform illumination of the imaging field of said camera.

23. A device according to claim 22, wherein said clip portion has a semicircular shape and an arcuate inner surface which conforms to the curvature of an outer surface of said lamp.

24. A device according to claim 22, wherein said hook portion has a generally U-shape which can extend around at least a portion of said frame part of said camera to connect to said frame part to locate said reflector portion relative to said lamp.

25. A device according to claim 22, further comprising at least one tab which interconnects said clip portion and said hook portion.

26. An apparatus comprising:

an imaging camera including a frame part;

a tubular lamp for providing light for said camera; and a device including (i) a first portion connected to an end of said lamp to reflect light from said lamp, and (ii) a second portion connected to said frame part of said camera to ground out electrostatic charge on an outer surface of said lamp, dissipate heat generated by said lamp, and gradually correct brightness roll-off at the end of said lamp to produce a uniform illumination of an imaging field of said camera;

said first portion including a reflector portion for reflecting light from said lamp, said reflector portion including a parabolic body portion and a pointed end portion projecting away from said parabolic body portion;

said second portion including a locating portion for locating said reflector portion relative to said lamp such that light reflected from said reflector portion cooperates with light from said lamp to gradually correct brightness roll-off at the end of said lamp to produce the uniform illumination of the imaging field of said camera;

said locating portion including (i) a clip portion extending from said reflector portion and for connecting to the end of said lamp to enable said reflector portion to reflect light from said lamp, and (ii) a hook portion extending from said clip portion and for connecting to a frame part of said camera to locate said reflector portion relative to said lamp such that light reflected from said reflector portion cooperates with light from said lamp to gradually correct brightness roll-off at the end of said lamp to produce the uniform illumination of the imaging field of said camera.

27. A device according to claim 26, wherein said pointed end portion points in a direction towards the center of said lamp.

28. An apparatus comprising:

an imaging camera including a frame part;

a tubular lamp for providing light for said camera; and a device including (i) a first portion connected to an end of said lamp to reflect light from said lamp, and (ii) a second portion connected to said frame part of said camera to ground out electrostatic charge on an outer surface of said lamp, dissipate heat generated by said lamp, and gradually correct brightness roll-off at the end of said lamp to produce a uniform illumination of an imaging field of said camera;

said first portion including a reflector portion for reflecting light from said lamp, said reflector portion having a conical shape which widens towards the center of said lamp;

said second portion including a locating portion for locating said reflector portion relative to said lamp such that light reflected from said reflector portion cooperates with light from said lamp to gradually correct brightness roll-off at the end of said lamp to produce the uniform illumination of the imaging field of said camera;

said locating portion including (i) a clip portion extending from said reflector portion and for connecting to the end of said lamp to enable said reflector portion to reflect light from said lamp, and (ii) a hook portion extending from said clip portion and for connecting to a frame part of said camera to locate said reflector portion relative to said lamp such that light reflected from said reflector portion cooperates with light from said lamp to gradually correct brightness roll-off at the end of said lamp to produce the uniform illumination of the imaging field of said camera.

* * * * *